US010286735B2

(12) United States Patent
Guinart et al.

(10) Patent No.: US 10,286,735 B2
(45) Date of Patent: May 14, 2019

(54) METHOD AND EQUIPMENT FOR MONITORING TYRE WEAR, AND VEHICLE ON-BOARD WEAR-MONITORING SYSTEM

(71) Applicants: CONTINENTAL AUTOMOTIVE FRANCE, Toulouse (FR); CONTINENTAL AUTOMOTIVE GMBH, Hannover (DE)

(72) Inventors: Nicolas Guinart, Toulouse (FR); Rachid Benbouhout, Cugnaux (FR); Jean-Charles Huard, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 234 days.

(21) Appl. No.: 15/127,178

(22) PCT Filed: Apr. 15, 2015

(86) PCT No.: PCT/EP2015/000789
§ 371 (c)(1),
(2) Date: Sep. 19, 2016

(87) PCT Pub. No.: WO2015/158430
PCT Pub. Date: Oct. 22, 2015

(65) Prior Publication Data
US 2017/0096036 A1 Apr. 6, 2017

(30) Foreign Application Priority Data
Apr. 18, 2014 (FR) .................................... 14 53561

(51) Int. Cl.
*B60C 11/24* (2006.01)
*B60C 23/04* (2006.01)
(Continued)

(52) U.S. Cl.
CPC .......... *B60C 11/246* (2013.01); *B60C 11/243* (2013.01); *B60C 23/0408* (2013.01); *G01M 17/02* (2013.01); *G01S 13/0209* (2013.01)

(58) Field of Classification Search
CPC .............. B60C 111/246; B60C 11/243; B60C 23/0408; G01M 17/02; G01S 13/0209
(Continued)

(56) References Cited

U.S. PATENT DOCUMENTS

| 4,584,534 A * | 4/1986 | Lijphart ................. H04B 14/08 |
| | | 329/308 |
| 6,736,004 B2 | 5/2004 | Evans et al. |

(Continued)

FOREIGN PATENT DOCUMENTS

| CN | 101620031 A | 1/2010 |
| CN | 102388290 A | 3/2012 |

(Continued)

OTHER PUBLICATIONS

International Search Report, dated Jun. 17, 2015, from corresponding PCT Application.

*Primary Examiner* — Frank J McGue
(74) *Attorney, Agent, or Firm* — Young & Thompson (57) ABSTRACT

A reliable and precise measurement of tire tread wear, by using wide-band (UWB) pulses and analyzing the signature obtained by reflection of these pulses from the tread, in order to deduce its state of wear therefrom. The tire wear monitoring device (100) includes a control unit (110) for signal control and data processing, this control unit (110) being coupled to a generator of ultra wide band or UWB signals (120), which is itself coupled to an antenna for incident UWB pulse transmission (140), and an antenna for receiving the UWB pulses (150) reflected from at least one interface of the tire tread, the reception antenna (150) being coupled (Continued)

to a pulse signal receiver (180) which is itself coupled to the control unit (110).

18 Claims, 4 Drawing Sheets (51) Int. Cl.
*G01M 17/02* (2006.01)
*G01S 13/02* (2006.01)

(58) Field of Classification Search
USPC .......................................................... 342/21
See application file for complete search history.

(56) References Cited

U.S. PATENT DOCUMENTS

| | | | |
|---|---|---|---|
| 7,603,894 B2 * | 10/2009 | Breed | B60C 11/24 |
| | | | 73/146 |
| 2003/0154007 A1 * | 8/2003 | Evans | B60C 23/066 |
| | | | 701/514 |
| 2006/0042734 A1 | 3/2006 | Turner et al. | |
| 2010/0000310 A1 | 1/2010 | Braghiroli | |
| 2012/0067115 A1 | 3/2012 | Pingel | |

FOREIGN PATENT DOCUMENTS

| | | |
|---|---|---|
| EP | 1 106 397 A2 | 6/2001 |
| EP | 2 141 475 A1 | 1/2010 |
| EP | 2 368 724 A1 | 9/2011 |
| WO | 2008/061770 A1 | 5/2008 |
| WO | 2010/115390 A1 | 10/2010 |

\* cited by examiner

METHOD AND EQUIPMENT FOR MONITORING TYRE WEAR, AND VEHICLE ON-BOARD WEAR-MONITORING SYSTEM

BACKGROUND OF THE INVENTION

The invention relates to a method for monitoring the wear of the tires of a vehicle using ultra wide band or UWB pulse transmission, and to a device for monitoring wear and an on-board system capable of executing this method.

Conventionally, tires are fitted on the rims of vehicle wheels in order to improve the adhesion of the wheels to the ground traveled over, regardless of the conditions of use. In particular, a tire comprises a tread in contact with the ground. This tread is a thick rubber layer, made of natural or synthetic rubber, in which "grooves" are cut to allow the discharge of water, snow and other loose material, thereby improving adhesion and reducing effects such as aquaplaning.

Under the tread, plies of parallel metal cords—usually two plies—are crossed over one another with the use of bonding, in order to form a stiffening belt and, in particular, to resist side thrust generated during cornering.

The tire tread becomes worn over time and the grooves tend to disappear gradually, possibly causing a loss of adhesion. In order to detect critical tire wear, beyond which point it may be considered dangerous to travel, a conventional method is to implant wear indicators. These indicators take the form of colored markers incorporated into the tread. When the tread becomes worn, its thickness decreases, and the markers eventually lie flush with the outer surface of the tread. The need to replace the tire can then be ascertained by visual inspection.

This conventional form of detection is unsatisfactory: it is imprecise, it is random because it depends on the frequency of tread inspection, and, finally, it is ineffective because the critical nature of this detection is not backed up by any alarm.

Consequently, other methods have been developed to overcome these drawbacks. One method is based on the incorporation of at least one wireless tag or RFID tag ("Radio Frequency Identification") marker in the tread of each tire, at a location corresponding to critical wear. This method is described, for example, in patent application US 2006/0042734.

In this method, the RFID tag is activated by a presence signal supplied by a transmitter, and transmits a confirmation signal to a detector in response. When the tire reaches critical wear, the tag is destroyed and ceases to respond to the presence signal: this lack of response triggers an alarm to warn the driver of the state of wear of the tire or tires.

Another method is that of associating a piezoelectric element, incorporated in the tire tread, with a generator of radio waves which are transmitted on the basis of the voltage signal generated by the piezoelectric element. Patent document EP 2368724 discloses a solution of this kind. According to this document, a detection unit receives these radio waves, and wirelessly transmits a tire wear data signal, based on the radio wave signal, to a receiving unit. The transmission of the wear data signal is triggered only when the radio wave signal is above a predetermined level. The driver can then be warned by an alarm device and a display on the receiving unit.

These methods lack precision in their mode of detection and are unreliable, since they are dependent on elements which, being incorporated into the treads, may be degraded over time.

Another approach is that of using the detection of the tire acceleration. Patent document EP 1106397 describes this approach for determining the wear of the tire tread by comparison between a resonance frequency of a radial or lateral acceleration of the tire, deduced by means of a Fourier transform, and at least one stored frequency.

This type of approach is similarly unreliable and imprecise, since it depends on the measurement of acceleration, which is a poor indicator of wear, used in complicated calculations and random comparisons based on stored values.

SUMMARY OF THE INVENTION

The invention is specifically intended to provide a reliable and precise measurement of tire tread wear. For this purpose, the invention proposes to use UWB ("Ultra Wide Band") wide-band pulses and to analyze the signature produced by these pulses on a tire tread and its environment, in order to deduce its state of wear therefrom.

More precisely, the present invention proposes a method for monitoring the wear of a vehicle tire tread comprising an inner layer having an inner interface, an intermediate layer incorporating at least one metal reinforcement face, and an outer running layer having an inner interface, consisting of a groove bottom, and a grooved outer interface, the tire being capable of traveling while forming a contact patch between the grooved outer face and a road. Said method consists in transmitting, from a source fitted near the tire, at least one wide-band (known as UWB) incident pulse signal toward the outer layer containing the contact patch of the tire on the road; receiving pulses reflected by the interfaces of the tread and by the road; determining, on the basis of a wear signature formed by the relative delays exhibited by at least one reflected pulse relative to the instant of transmission of the incident pulse, a state of wear of the tire by comparison between said wear signature and a previous wear signature of said tread; and triggering an alarm if the wear signature corresponds to a critical state of the tread defined on the basis of the predetermined risk of loss of adhesion of the tire contact patch on the road.

The wear signature can be defined on the basis of the relative delays exhibited by the pulses reflected by the road and/or by the grooved outer interface, advantageously accompanied by the relative delays of the pulses reflected by the inner groove bottom interface and/or by at least one metal reinforcement interface. Preferably, the transmission of the incident pulse signal is directed radially toward the contact patch of the grooved outer face on the road. Additionally, the wear signature is advantageously regularly sampled, and the successively sampled wear signatures are compared in order to determine a periodicity of transmission of the incident pulse signals on the basis of the corresponding mileage.

In order to eliminate the effects of the variable pressure of the tire and/or the variable load of the vehicle, the method according to the invention provides at least one supplementary step consisting of:
- analyzing the relative delay exhibited by a pulse reflected by the grooved outer interface in an area outside the contact patch, and comparing this relative delay with the relative delays of the wear signature; and/or
- also analyzing tire load and pressure data supplied by a dedicated detection system, deducing corrections of the relative delays of the reflected pulses, and modifying the wear signature accordingly.

Furthermore, in order to minimize interference with transmissions from nearby tires or from another vehicle in the vicinity, the incident pulse signal can be transmitted by encoding the pulses with a known frame specific to each tire.

The invention also relates to a device for monitoring tire wear, capable of executing the above method.

This device comprises a control unit for signal control and data processing, this control unit being coupled to a generator of ultra wide band (UWB) signals, which is itself coupled to an antenna for incident UWB pulse transmission, and an antenna for receiving the UWB pulses reflected from at least one interface of the tire tread and from the road, the reception antenna being coupled to a pulse signal receiver which is itself coupled to said control unit.

According to particular embodiments, the UWB pulse transmission and reception antennas form a single UWB pulse transmission/reception antenna or two separate antennas, one for transmission and one for reception. Preferably, the antenna or antennas have unidirectional transmission means and directional reception means, so that parasitic echoes can be eliminated.

Advantageously, a pulse amplifier is arranged between the output of the pulse signal generator and the UWB pulse transmission antenna input, and a filter assembly coupled to a low-noise amplifier is fitted between the UWB pulse reception antenna output and the input of the pulse signal receiver.

According to an advantageous embodiment:
the UWB pulse signal generator comprises a digital-analog converter or DAC for converting an initial signal launched by the control unit and modulated via a baseband transmission clock, said converter being coupled to a mixer via a filter so that the modulated and filtered signal carries a brief pulse of a radio frequency or RF signal supplied by an RF oscillator, also under the control of the control unit, the duration of the initial signal being adjusted so that the carried signal corresponds to a frequency spectrum with a width of at least 25% of the central frequency value of this spectrum, before being amplified and then transmitted by the transmission antenna in the form of a UWB pulse signal; and
the UWB pulse signal receiver comprises a mixer coupled to an analog-digital converter/sampler or ADCS, which is itself coupled to the control unit, to sample a reflected UWB pulse signal received from the reception antenna and mixed, after filtering and amplification, with an RF signal supplied by a local radio frequency oscillator which is also under the control of the control unit, the sampling being timed by a baseband clock under the control of the control unit, to supply a digital UWB pulse signal to the control unit corresponding to the reflected UWB pulse signal.

The control unit may advantageously comprise a correlator, for the purpose of correlating the digital UWB pulse signals supplied by the ADCS sampler/converter and thus forming a wear signature, this correlator being coupled to a digital processing unit to determine a state of wear of the tire on the basis of the successive signatures. Alternatively, the digital processing unit can be positioned remotely from the control unit, so as to form, in particular, a central computer in a system for monitoring the wear of the tires of a vehicle, and the link between the correlator and the computer is then provided by RF or UWB signals via antennas suitable for transmitting these signals.

The invention also relates to an on-board system for monitoring the wear of tires on the wheels of a vehicle. This system is composed of wear monitoring devices such as the device defined above—comprising a generator, a UWB pulse signal receiver, a UWB pulse transmission/reception antenna, and a control unit incorporating a correlator—and a central digital computer incorporating a processing unit. Each device is suitable for incorporation into a wheel unit fitted on each wheel of the vehicle. An RF or UWB signal antenna, fitted at the output of each wheel unit, transmits the correlated UWB pulse signals, and these signals can be received by the central digital computer on board the vehicle. This central digital computer is connected to an RF or UWB signal reception antenna, and can determine a state of wear of each tire on the basis of successive correlations transmitted by the antennas of the wheel units to the processing unit.

The output antenna of each wheel unit may advantageously be the UWB pulse signal transmission/reception antenna, enabling the architecture to be simplified.

Preferably, if the vehicle is equipped with a tire pressure monitoring system or TPMS comprising wheel units each equipped with a pressure sensor in each wheel of the vehicle and an on-board central computer, a device for determining the tire wear is incorporated into each wheel unit, and the on-board computer of the TPMS acts as the central digital computer defined above. This solution enables wheel units to be used jointly with an on-board computer, which also minimizes costs.

BRIEF DESCRIPTION OF THE DRAWINGS

Other data, characteristics and advantages of the present invention will become apparent in the light of the following non-limiting description, referring to the attached drawings, which show, respectively.

DETAILED DESCRIPTION OF THE PREFERRED EMBODIMENTS

Figure 1:
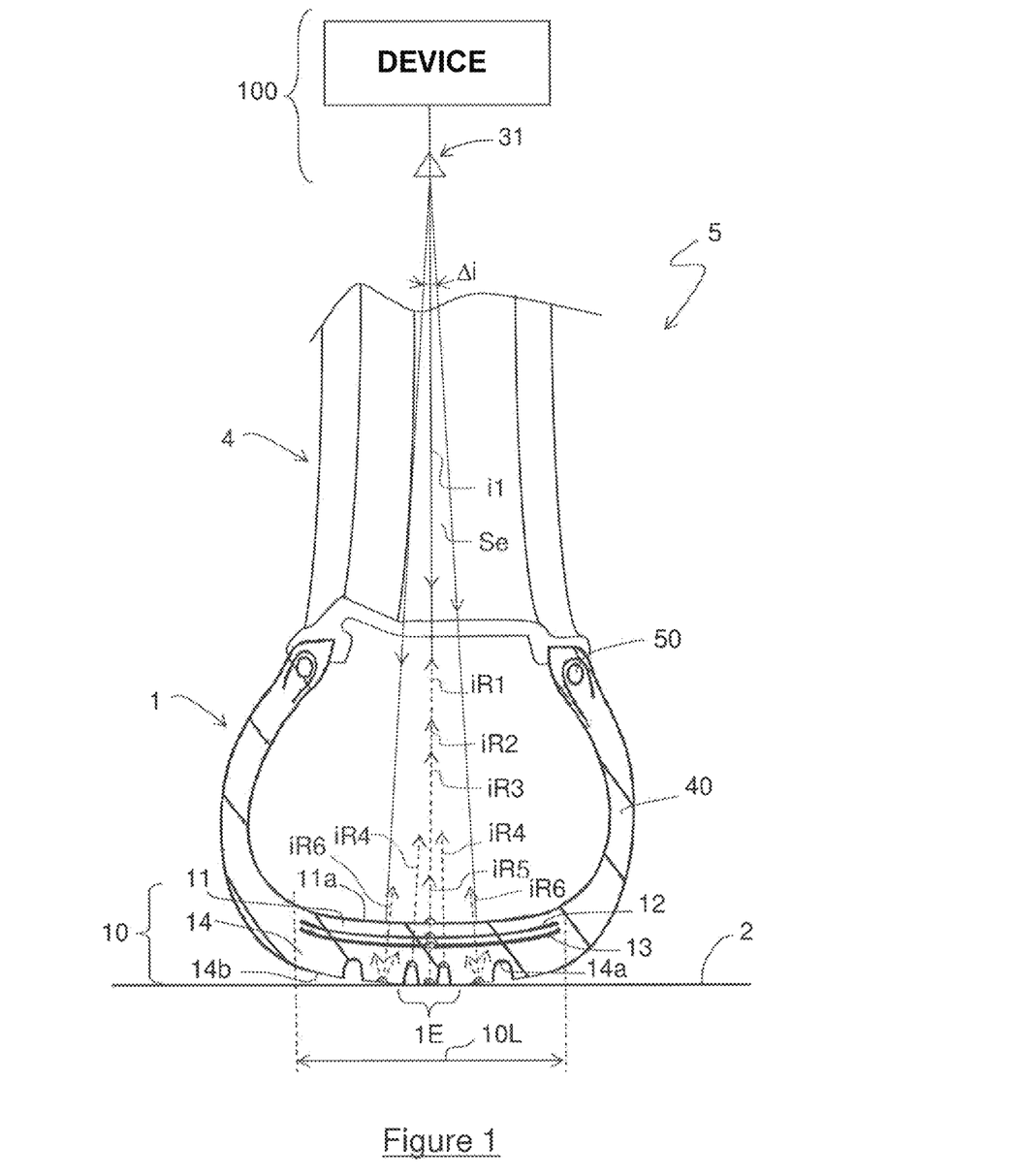
in FIG. 1, a diagram of the propagation of the pulses reflected at the interfaces of a tire tread seen in cross section on a road, forming an echo of an incident pulse transmitted by a device according to the invention.

The cross-sectional view of a tire 1 on a road 2 given in FIG. 1 shows the propagation of the pulses iR1 to iR6 reflected by the tread 10 of the tire 1 and by the road 2. The pulses iR1 to iR5 are produced by successive reflections, from the interfaces formed by the tread 10, of each incident pulse i1 of a train of incident pulses with a wide frequency band, called UWB pulses, forming a transmission signal Se.

The transmitted UWB signal Se is produced by a wear monitoring device 100 equipped with an antenna 31 for transmission/reception—unidirectional for transmission and directional for reception—toward the tread 10 and within the boundaries of the width 10L of the tread. This device 100 is installed in the rim 4 of the wheel 5 of the motor vehicle (not shown) on which the tire 1 is fitted.

The tire 1 conventionally has an annular structure and the transmission/reception antenna 31, housed in the rim 4, transmits signals Se which are mainly directed radially. In the illustrated example, the tire 1 has sidewalls 40 made of more flexible rubber than the tread 10 and two annular metal rings 50 for attachment to the rim 4. The tread 10 comprises, from the inside of the tire 1 to its contact patch 1E on the road 2, the following interfaces: an inner layer 11, two metal plies 12 and 13 forming a reinforcement, and a grooved outer layer 14 formed by a groove bottom 14a and an outer face 14b for contact with the road 2.

The reflected pulses iR1 to iR6 then originate, respectively, from the successive reflections of the incident pulses i1 from the face 11a of the inner layer 11, from the metal plies 12 and 13, from the groove bottom 14a of the outer layer 14, from the road 2, and from the outer face 14b of the outer layer 14. The reflection from the outer face 14b is distinguished from the reflection from the road 2 when the outer face 14b does not adhere to the road 2, that is to say outside the contact patch 1E. Thus the reflection iR6 from the outer face 14b appears for an incident pulse i1 which reaches this outer face 14b in the width 10L of the tread 10 but outside the contact patch 1E, with an angular deviation $\Delta i$ of the incident pulse i1.

For the same incident pulse i1, the successive reflections forming the reflected pulses iR1 to iR6 have increasingly low amplitudes, because, at each reflection interface 11, 12, 13, 14a and 14b, a part of the incident pulse is refracted and another part is absorbed into the tread 10.

Figure 2:
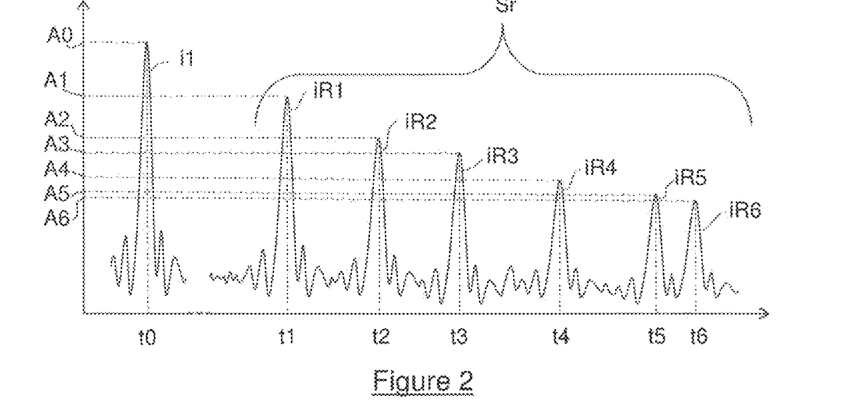
in FIG. 2, a diagram of the amplitudes of an incident pulse and of the echoing reflected pulses according to FIG. 1, as transmitted and received successively by the device according to the invention.

The decreasing level of the reflected pulses is seen in the diagram of FIG. 2. This diagram shows, in connection with the references of FIG. 1, the levels of amplitude "A", namely A1 to A6, of these reflected pulses iR1 to iR6. Said pulses iR1 to iR6 are captured successively by the antenna 31 (FIG. 1) as a function of time "t", at the instants t1 to t6, echoing the incident pulse transmitted at the instant t0. The set of reflected and captured pulses iR1 to iR6 forms a received UWB signal Sr.

This diagram makes it possible to deduce by calculation the distances between the reflection interfaces 11, 12, 13, 14a, 2 and 14b (FIG. 1), which are proportional to the relative delays of the corresponding reflected pulses iR1 to iR6. The wear of the tread has an effect on its thickness and therefore on the instants of reception of the pulses iR5 or iR6 reflected from the road 2 or from the outer face 14b respectively (FIG. 1). The delays of these reflected pulses iR5 or iR6 relative to the other reflected pulses iR1 to iR4 are correlated in order to discover the thickness of the tread according to different combinations of delay, the set of these correlations forming a wear signature of the tread. The variation in time of this signature can then be used to establish wear monitoring. The reflected pulses are converted into digital form before being processed (as described below with reference to FIG. 4b).

Thus, a first correlation is established for monitoring the thickness of the outer layer 14 of the tread 10. The thickness of the outer layer 14 is deduced directly from the difference (t6–t4) between the instants of reception of the reflected pulses iR6 and iR4, formed by reflection of the incident pulses i1 from the outer face 14b and from the groove bottom 14a of this outer layer 14. The variation of this outer layer thickness Ve(t) as a function of time is an indicator of the wear of the outer layer 14 and therefore of the tire.

Other correlations between the instants of reception of the pulses reflected by the reflection interfaces of the tread can be used to discover the wear of the tread.

Thus the distances between the outer face 14b and any interface of the tread 10 other than the groove bottom 14a—that is to say, the inner face 11a and one of the metal plies 12 and 13—can be used to determine the wear. These distances are proportional to the differences between the instants of reception of the reflected pulse iR6 and the corresponding reflected pulses iR1, iR2, iR3, namely (t6–t1), (t6–t2) and (t6–t3) respectively.

Additionally, the instants t5 and t6 vary in a substantially identical manner, since the reflection from the road 2 and from the outer face 14b are similar, except as regards the compression of the tread 10 on the road 2 and the angular variation "$\Delta i$" of the incident pulse i1 (FIG. 1). It is therefore also advantageous to confirm the above correlations by determining the distance between the road 2 (FIG. 1), the interface where the reflection pulse iR5 appears, and one of the interfaces of the tread 10 (FIG. 1).

This distance is determined proportionally to the difference between the instant t5 of reception of the reflection pulse iR5 and any instant t1 to t4 of reception of one of the reflection pulses iR1 to iR4 from one of said interfaces, namely the inner face 11a, one of the metal plies 12 and 13, and the groove bottom 14a.

Figure 3:
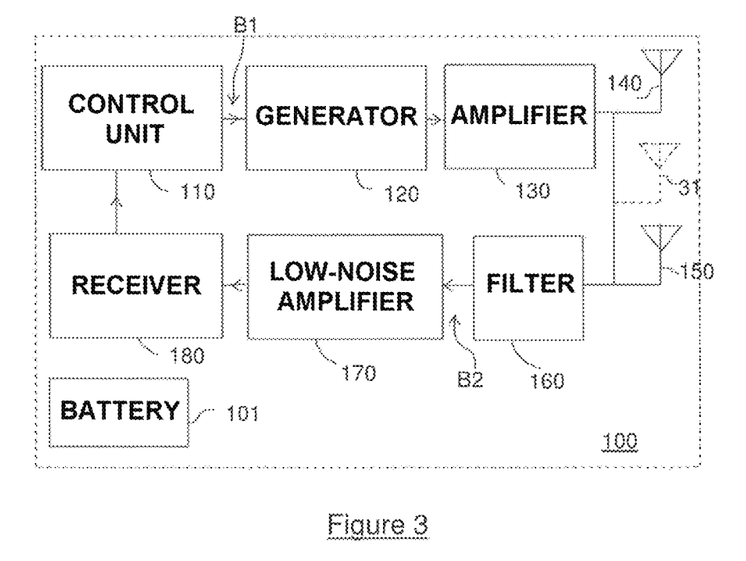
in FIG. 3, a diagram of an exemplary device according to the invention, comprising a single transmission/reception antenna, or, in a variant, two antennas, one for transmitting and one for receiving the pulses.

The processing of the instants of reception of the transmitted and captured UWB signals Se and Sr is carried out in a device according to the invention, for the purpose of establishing correlations between these instants, a wear signature of the tread based on these correlations, and wear monitoring over time. FIG. 3 is a more precise version of the diagram of an exemplary device 100 according to the invention.

This device 100 comprises a control unit 110, dedicated to the control of the transmitted signal Se and to the processing of the data supplied by the reception signal Sr. The programming of transmission of the signals Se provides for a transmission at each start-up and periodically thereafter, for example once every hour. The transmission frequency is increased on the basis of the mileage covered by the tire and the wear curve supplied by the tire manufacturer. Pressure data for the tire, obtained for example from a system for monitoring this pressure incorporated into the vehicle, may advantageously be used for the correction of said transmission frequency.

The control unit 110 is linked to a first transmission branch B1, comprising a generator 120 for the transmission of UWB pulse signals Se, coupled at its output to a UWB pulse amplifier 130 connected to the antenna 140 for the transmission of these signals. A battery 101 forms the electrical power source of the device 100.

The device 100 comprises a second branch B2, called the reception branch for the UWB pulse signals Sr after reflection from the tread 10 of the tire 1 being monitored for wear (FIG. 1). The second branch B2 comprises a reception antenna 150 for the signals Sr, coupled to a filter 160, for selecting the UWB signals having the same spectral width as the transmitted signals Se, connected at its output to a low-noise amplifier 170 coupled to the input of a pulse receiver 180 capable of storing the captured signals Sr. At the output of this pulse receiver 180, the second branch B2 is connected to the control unit 110 of the device 100.

Preferably, the transmission antenna 140 is unidirectional, to increase the precision of the direction of propagation of the transmitted pulses, and the reception antenna 150 is directional, in order to avoid parasitic echoes as far as possible. In a variant, the transmission antenna 140 and reception antenna 150 are replaced by the single transmission/reception antenna 31 (FIG. 1), thereby making the device more compact, simplifying the circuit and minimizing costs. However, this antenna with a double transmission and reception function is more sensitive to interference and parasitic echoes.

Figure 4A:
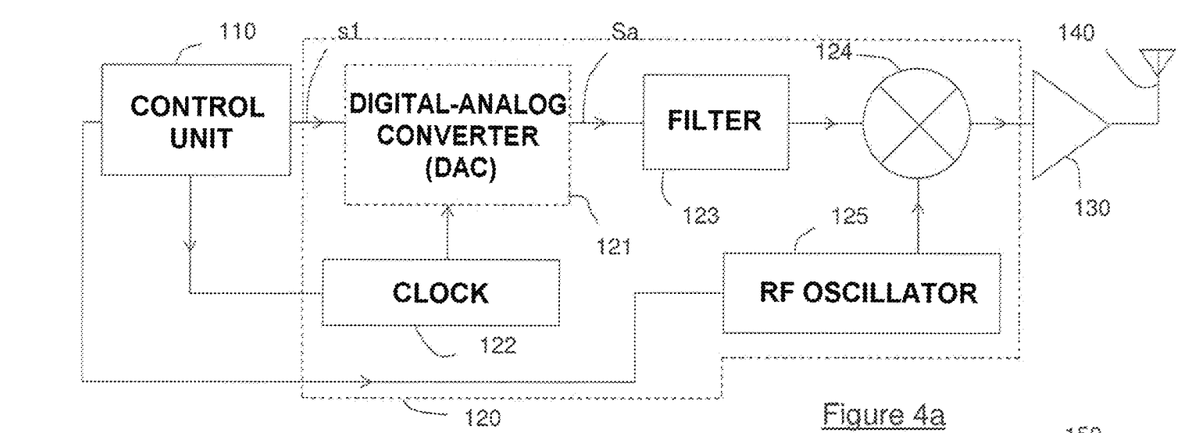
in FIGS. 4a and 4b, diagrams of an exemplary generator and an exemplary receiver of pulses of a device according to the invention, and in FIG. 5, a diagram of a simplified architecture of a wear monitoring system on board a vehicle.

More precisely, an example of a pulse generator 120 is shown in FIG. 4a, linked to the control unit 110 upstream and to the pulse amplifier 130 connected to the transmission antenna 140 downstream.

This UWB pulse generator 120 comprises a digital/analog converter or DAC 121 for supplying, from an initial signal s1 launched by the control unit 110, an analog signal Sa modulated via a baseband transmission clock 122. The DAC converter 121 is coupled to a mixer 124 via a filter 123 so that the analog signal Sa carries a brief radio frequency pulse of an RF signal supplied by an RF oscillator 125, also controlled by the control unit 110. Each brief radio frequency pulse forms one of the incident pulses i1 of the transmission signal Se after amplification (by the amplifier 130) and transmission (by the antenna 140).

The duration of the radio frequency pulses carried is set by the control unit 110—at a nanosecond, for example, or at a shorter duration—so that the pulse signal carried corresponds to a frequency spectrum whose width is equal to 25% of the value of the central frequency of this spectrum, before being amplified by the pulse amplifier 130 at the output of the mixer 124 and then transmitted by the transmission antenna 140 in the form of a UWB pulse signal. For example, if each incident pulse is centered on 2 GHz, the width of the frequency band is 500 MHz.

Figure 4B:
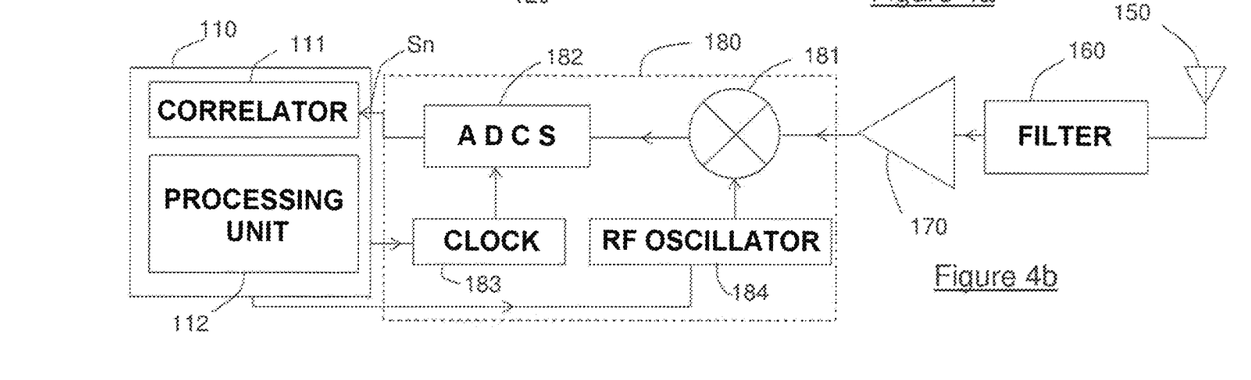

In the same way that FIG. 4a shows the pulse generator 120, FIG. 4b shows an example of a pulse receiver 180, linked to the pulse amplifier 170 connected to the reception antenna 150 via the filter 160 upstream and to the control unit 110 downstream.

This pulse receiver 180 comprises a mixer 181, coupled to an analog-digital converter/sampler (ADCS) 182, which is itself coupled to the control unit 110. The ADCS 182 samples the pulses of the reflected UWB pulse signal Sr when it has been captured by the reception antenna 150, filtered (filter 160) and amplified (170).

Before being sampled, the reflected UWB pulse signal Sr is reduced by mixing with an RF signal supplied by a local RF oscillator 184 (which may also be the oscillator 125 of the pulse generator 120) under the control of the control unit 110. The sampling by the ADCS 182 is timed by a baseband clock 183 (which may be the clock 122 of the pulse generator 120), also under the control of the control unit 110. A digital signal Sn, corresponding to a captured UWB signal pulse Sr, is then transmitted to the control unit 110 to be processed there.

This control unit 110 advantageously comprises a correlator 111, for establishing correlations between the successively processed digital signals iRn on the basis of their delay, as described with reference to FIG. 2. The correlator 111 is coupled to a digital processing unit 112 for the purpose of creating a wear signature and determining a state of wear of the tire on the basis of the successive signatures. If the state of wear corresponds to a predetermined critical state, an alert is triggered by the control unit 110 and transmitted by the antenna 140 or 31. The alert signal is transmitted to an appropriate receiver incorporated into the dashboard of the vehicle. This reception triggers a visual and/or audible alarm.

Alternatively, the digital processing unit can be positioned remotely from the control unit, for example in the form of a central digital computer as described below, and the link between the correlator and this computer is then provided by RF or UWB signals via antennas suitable for transmitting these signals. This remote architecture can form an on-board wear monitoring system for all the tires of a vehicle, the use of the central digital computer thus being advantageously shared.

Figure 5:
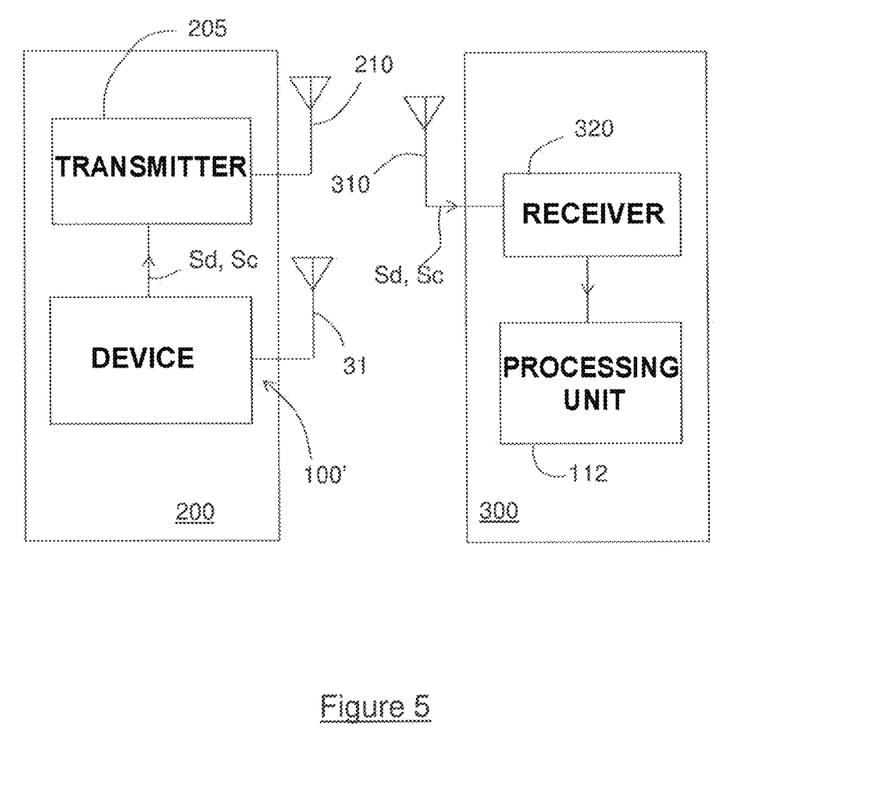

With reference to FIG. 5, the simplified diagram of a wear monitoring system on board a vehicle is illustrated. The system is illustrated by one of the wear monitoring devices 100', as incorporated into each of the wheels, and a central digital computer 300, in communication with the set of devices 100'.

Each wear monitoring device 100' is simplified relative to the previously mentioned device 100, in that the digital processing unit 112 is no longer in the device and is positioned remotely in a central digital computer 300 capable of processing the signals from all the wear monitoring devices 100'.

Each wear monitoring device 100' is incorporated into a wheel unit 200, fitted on each wheel of the vehicle (not shown), with its UWB pulse signal transmission/reception antenna 31. An RF signal communication antenna 210 is fitted at the output of each wheel unit 200 and is linked to a transmitter 205. This antenna 210 transmits digitized pulse signals Sd and/or correlated pulse signals Sc supplied by the control unit of the device 100', toward a reception antenna 310 of the on-board central computer 300.

In the on-board central computer 300, the digitized pulse signals Sd and/or the correlated signals Sc are first captured by the RF signal reception antenna 310, connected to an RF signal receiver 320, before being processed by the digital processing unit 112. The digital processing unit determines a state of wear of each tire on the basis of successive correlations supplied by the captured correlated pulse signals, as described above.

Alternatively, the communication antennas 210 fitted at the outputs of the wheel units 200 are UWB signal antennas, in which case they are advantageously formed by UWB pulse signal transmission/reception antennas 31 of the wear monitoring devices 100'. Communications then take place outside the transmission and reception of UWB signals used for determining the wear.

If the vehicle is already equipped with a tire pressure monitoring system or TPMS, comprising wheel units such as the wheel unit 200, each equipped with a pressure sensor, in each wheel of the vehicle, and an on-board central computer such as the computer 300, then each tire wear monitoring device 100' is incorporated into each existing wheel unit. The on-board computer of the TPMS acts as an on-board central computer 300, and incorporates the digital processing unit 112. In this case also, the critical wear alert signal is controlled by the TPMS, which comprises a receiver incorporated into the dashboard of the vehicle for triggering an alarm.

The invention is not limited to the exemplary embodiments described and represented.

For example, the sampling durations may be optimized according to the desired resolution of the measurements. Additionally, the measurement of the durations of the pulses (and therefore the distances between the interfaces of the tread) may use different detection and/or correlation and/or thresholding methods. In particular, these include pulse edge detection, maximum value detection, correlation with a pulse mask or signature in the widest sense (understood as a set of characteristic parameters of the pulse, such as the average of the points in a given time interval, the difference between the maximum and minimum values, etc.).

The duration between two pulses may be used as an optimization parameter, on the basis of the tire structure (number of layers and dielectric property of each layer). It may advantageously be adjusted to a number of optimized discrete values, according to the complex nature of the materials present in the tire.

The positioning of the wear monitoring device can be optimized so as to minimize the deformation of the reflected wave relative to the incident wave, particularly for signature detection.

The directionality of the antennas can also be optimized according to the choice of functions and the number of antennas used for transmission and/or reception of UWB and/or RF signals. The number of antennas and their respective positions also depends on whether use is made of the pulse reflections on a direct propagation path or on oblique paths.

Additionally, the orientation of the antennas facing the tread is also an optimization parameter for maximizing the amplitude of the reflected pulse signals.

In order to minimize interference with transmissions from nearby tires or from a vehicle in the vicinity, the signal can be transmitted by encoding the pulses with a known frame specific to each tire. The code is chosen at will from a list of codes considered to be capable of minimizing the probability of interference on the ground.

This code may, for example, encode the presence or absence of one or more pulses in windows having a known transmission time. This code may be an inversion of the pulse.

Additionally, a random time interval may be introduced before the transmission of each pulse to minimize interference and collision with transmissions from other sensors in the vicinity. This random time interval may also be determined by using a pseudo-random code.

The invention claimed is:

1. A method for monitoring the wear of a tread (10) of a vehicle tire (1), where the tread (10) has an inner layer (11) with an inner interface (11*a*), an intermediate layer incorporating at least one metal reinforcement interface (12, 13), and an outer layer (14) with an inner interface, which includes a groove bottom (14*a*), and a grooved outer interface (14*b*), the vehicle tire being capable of traveling while forming a contact patch (1E) of the grooved outer face (14*b*) on a road (2), the method comprising:
   transmitting, from a source arranged near the vehicle tire (1), at least one wide band (UWB) incident pulse signal (i1) toward the outer layer (14) containing the contact patch (1E) of the vehicle tire (1) on the road (2);
   receiving (31, 150, 310) pulses (iR1 to iR6) reflected by the interfaces (11*a*, 12, 13, 14*a*, 14*b*) of the tread (10) and by the road (2);
   determining a wear signature of said tread by measuring relative delays exhibited by reflected pulses relative to an instant of transmission (t0) of the incident pulse (i1), said determined wear signature being defined based on the relative delays exhibited by at least one of the pulses (iR5, iR6) reflected by the road (2) and the grooved outer interface (14*b*), and the relative delays of the pulses (iR4; iR2, iR3) reflected by at least one of the inner groove bottom interface (14*a*) and said at least one metal reinforcement interface (12, 13); and
   triggering an alarm upon detection that the wear signature corresponds to a critical state of the tread (10) defined with respect to the predetermined risk of losses of adhesion of the contact patch (1E) of the vehicle tire (1) on the road (2).

2. The wear monitoring method as claimed in claim 1, wherein the wear signature is regularly sampled from a plurality of successive incident pulses to produce a plurality of successively sampled wear signatures, and wherein the successively sampled wear signatures are compared in order to determine a periodicity of transmission of the incident pulse signals based on a corresponding mileage.

3. The wear monitoring method as claimed in claim 2, further comprising at least one of:
   comparing a relative delay exhibited by a pulse reflected by the grooved outer interface (14*b*) in an area outside the contact patch (1E) with the relative delays of the wear signature; and
   analyzing tire load and pressure data supplied by a dedicated detection system, deducing corrections of the relative delays of the reflected pulses, and modifying the wear signature accordingly.

4. The wear monitoring method as claimed in claim 1, further comprising at least one of:
   comparing a relative delay exhibited by a pulse reflected by the grooved outer interface (14*b*) in an area outside the contact patch (1E) with the relative delays of the wear signature; and
   analyzing tire load and pressure data supplied by a dedicated detection system, deducing corrections of the relative delays of the reflected pulses, and modifying the wear signature accordingly.

5. A tire wear monitoring device (100, 100') for monitoring the wear of a tread (10) of a vehicle tire (1), where the tread has an inner layer (11) with an inner interface (11*a*), an intermediate layer incorporating at least one metal reinforcement interface (12, 13), and an outer layer (14) with an inner interface, which includes a groove bottom (14*a*), and a grooved outer interface (14*b*), the vehicle tire being capable of traveling while forming a contact patch (1E) of the grooved outer face (14*b*) on a road (2), comprising:
   a control unit (110) for signal control and data processing;
   a generator (120) of ultra wide band (UWB) signals (Se), said generator (120) coupled to said control unit (110);
   one or more antennas configured to transmit incident UWB pulses and receive reflected UWB pulses (150) reflected from at least one interface of the tire tread; and
   a pulse signal receiver (180), said pulse signal receiver (180) coupled to said control unit (110),
   wherein said control unit is configured to
      transmit, from the one or more antennas arranged near the vehicle tire (1), at least one wide band (UWB) incident pulse signal (i1) toward the outer layer (14) containing the contact patch (1E) of the vehicle tire (1) on the road (2),
      receive, via the one or more antennas, pulses (iR1 to iR6) reflected by the interfaces (11*a*, 12, 13, 14*a*, 14*b*) of the tread (10) and by the road (2),
      determine a wear signature of said tread by measuring relative delays exhibited by reflected pulses relative to an instant of transmission (t0) of the incident pulse (i1), said determined wear signature being defined based on the relative delays exhibited by at least one of the pulses (iR5, iR6) reflected by the road (2) and the grooved outer interface (14*b*), and the relative delays of the pulses (iR4; iR2, iR3) reflected by at least one of the inner groove bottom interface (14a) and said at least one metal reinforcement interface (12, 13), and trigger an alarm upon detection that the wear signature corresponds to a critical state of the tread (10) defined with respect to the predetermined risk of losses of adhesion of the contact patch (1E) of the vehicle tire (1) on the road (2).

6. The wear monitoring device as claimed in claim 5, wherein the one or more antennas comprise two separate antennas, a first of said two antennas configured for transmission (140) and a second of said two antennas configured for reception (150).

7. The wear monitoring device as claimed in claim 6, wherein the one or more antennas have unidirectional transmission means and directional reception means.

8. The wear monitoring device as claimed in claim 6, wherein a pulse amplifier (130) is arranged between an output of the pulse signal generator (120) and the one or more antennas, and wherein a filter assembly (160), coupled to a low-noise amplifier (170), is fitted between the one or more antennas and an input of the pulse signal receiver (180).

9. The wear monitoring device as claimed in claim 6, wherein:

the UWB pulse signal generator (120) comprises a digital-analog converter (DAC) (121) that converts an initial signal (s1) launched by the control unit (110) and modulated via a baseband transmission clock (122), said converter (121) being coupled to a mixer (124) via a filter (123) so that a modulated and filtered signal (Sa) carries a brief pulse of a radio frequency (RF) signal supplied by an RF oscillator (125), also under control of the control unit (110), a duration of the initial signal being adjusted so that a carried signal corresponds to a frequency spectrum with a width of at least 25% of the central frequency value of said frequency spectrum, before being amplified (130) and then transmitted by the transmission antenna (140) in the form of a UWB pulse signal; and the UWB pulse signal receiver (180) comprises a mixer (181) coupled to an analog-digital converter/sampler (ADCS) (182), said ADCS being coupled to the control unit (110) and configured to perform sampling upon a reflected UWB pulse signal received from the one or more antennas and mixed, after filtering (160) and amplification (170), with an RF signal supplied by a local radio frequency oscillator (184) which is also under control of the control unit (110), the sampling being timed by a baseband clock (183) under control of the control unit (110), to supply a digital UWB pulse signal (Sn) to the control unit (110) corresponding to the reflected UWB pulse signal (Sr).

10. The wear monitoring device as claimed in claim 6, wherein the control unit (110) comprises a correlator (111) that correlates successive digital UWB pulse signals (Sn) supplied by an analog-digital converter/sampler (ADCS) (182) and forms successive wear signatures, said correlator (111) being coupled to a digital processing unit (112) to determine a state of wear of the tire on the basis of the successive wear signatures.

11. The wear monitoring device as claimed in claim 10, wherein the digital processing unit (112) is positioned remotely from the control unit (110), so as to form a central computer in a system for monitoring wear of a plurality of tires of the vehicle, and a link between the correlator (111) and the computer is provided by one of radio frequency (RF) and UWB signals.

12. The wear monitoring device as claimed in claim 5, wherein a pulse amplifier (130) is arranged between an output of the pulse signal generator (120) and the one or more antennas, and wherein a filter assembly (160), coupled to a low-noise amplifier (170), is fitted between the one or more antennas and an input of the pulse signal receiver (180).

13. The wear monitoring device as claimed in claim 5, wherein the control unit (110) comprises a correlator (111) that correlates successive digital UWB pulse signals (Sn) supplied by an analog-digital converter/sampler (ADCS) (182) and forms successive wear signatures, said correlator (111) being coupled to a digital processing unit (112) to determine a state of wear of the tire on the basis of the successive wear signatures.

14. The wear monitoring device as claimed in claim 13, wherein the digital processing unit (112) is positioned remotely from the control unit (110), so as to form a central computer in a system for monitoring wear of a plurality of tires of the vehicle, and a link between the correlator (111) and the computer is provided by one of radio frequency (RF) and UWB signals.

15. An on-board monitoring system for monitoring the wear of tires of vehicle wheels, comprising a plurality of wear monitoring devices as claimed in claim 5, and a central digital computer (300) incorporating a processing unit (112), each of said wear monitoring devices (100') configured to be incorporated into a wheel unit (200) fitted on each wheel of the vehicle, the control unit of each of said wear monitoring devices incorporating a correlator (111), a signal antenna (205, 210) fitted at an output of each wheel unit (200) transmits correlated UWB pulse signals receivable by the central digital computer (300) on board the vehicle, and said central digital computer (300) is connected to a signal reception antenna (310, 320) for receiving successive correlations transmitted by the antennas of the wheel units (200), and the processing unit (112) configured to determine a state of wear of each tire based on said received successive correlations.

16. The on-board wear monitoring system as claimed in claim 15, wherein the signal antenna (210) of each wheel unit is the one or more antennas of the wheel unit.

17. The on-board wear monitoring system as claimed in claim 15, wherein the wheel units (200) are each equipped with a pressure sensor, and the central digital computer (300) forms part of a tire pressure monitoring system.

18. A tire wear monitoring device, comprising:
a control unit (110) for signal control and data processing;
an ultra wide band (UWB) pulse signal generator (120) configured to generate UWB signals (Se), said UWB pulse signal generator (120) coupled to the control unit (110);
a UWB pulse signal receiver (180) coupled to said control unit (110); and
one or more antennas configured to receive reflected UWB pulses (150) reflected from at least one interface of the tire tread (11a, 12, 13, 14a, 14b) and from the road (2), the one or more antennas coupled to the UWB pulse signal receiver (180) and the generator (120),
wherein:
the UWB pulse signal generator (120) comprises a digital-analog converter (DAC) (121) that converts an initial signal (s1) launched by the control unit (110) and modulated via a baseband transmission clock (122), said converter (121) being coupled to a mixer (124) via a filter (123) so that a modulated and filtered signal (Sa) carries a brief pulse of a radio frequency (RF) signal supplied by an RF oscillator (125), also under control of the control unit (110), a duration of the initial signal being adjusted so that a carried signal corresponds to a frequency spectrum with a width of at least 25% of the central frequency value of said frequency spectrum, before being amplified (130) and then transmitted by the transmission antenna (140) in the form of a UWB pulse signal; and the UWB pulse signal receiver (180) comprises a mixer (181) coupled to an analog-digital converter/sampler (ADCS) (182), said ADCS being coupled to the control unit (110) and configured to perform sampling upon a reflected UWB pulse signal received from the one or more antennas and mixed, after filtering (160) and amplification (170), with an RF signal supplied by a local radio frequency oscillator (184) which is also under control of the control unit (110), the sampling being timed by a baseband clock (183) under control of the control unit (110), to supply a digital UWB pulse signal (Sn) to the control unit (110) corresponding to the reflected UWB pulse signal (Sr).

* * * * *